US012520110B2

United States Patent
Stockhammer et al.

(10) Patent No.: US 12,520,110 B2
(45) Date of Patent: Jan. 6, 2026

(54) HYBRID 5G MEDIA STREAMING

(71) Applicant: QUALCOMM Incorporated, San Diego, CA (US)

(72) Inventors: Thomas Stockhammer, Bergen (DE); Imed Bouazizi, Frisco, TX (US); Charles Nung Lo, San Diego, CA (US); Ralph Akram Gholmieh, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 17/885,282

(22) Filed: Aug. 10, 2022

(65) Prior Publication Data

US 2023/0050764 A1   Feb. 16, 2023

Related U.S. Application Data

(60) Provisional application No. 63/260,219, filed on Aug. 12, 2021.

(51) Int. Cl.
*H04W 4/06* (2009.01)
*H04L 65/65* (2022.01)

(52) U.S. Cl.
CPC .............. *H04W 4/06* (2013.01); *H04L 65/65* (2022.05)

(58) Field of Classification Search
CPC ..... H04L 65/612; H04L 65/611; H04L 65/65; H04L 65/80; H04W 4/06
See application file for complete search history.

(56) References Cited

U.S. PATENT DOCUMENTS

2018/0288500 A1* 10/2018 Stockhammer ...... H04N 21/845
2018/0332089 A1* 11/2018 Lohmar ................ H04L 65/613
2019/0075545 A1*  3/2019 Praturi ................... H04W 72/02

FOREIGN PATENT DOCUMENTS

WO   WO-2019046505 A1   3/2019

OTHER PUBLICATIONS

3GPP TR 26.802, "3rd Generation Partnership Project; Technical Specification Group Services and System Aspects; Multicast Architecture Enhancement for 5G Media Streaming (Release 17)", Jun. 2021 (Year: 2021).*

(Continued)

*Primary Examiner* — Ji-Hae Yea
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive an indication that a 5G media streaming (5GMS) service is partially available over a 5G multicast/broadcast service (5MBS). The UE may receive information that indicates a first set of resources of the 5GMS service that are accessible or delivered via 5G unicast, and a second set of resources of the 5GMS service that are accessible or delivered via 5MBS, wherein the second set of resources are hosted on a server of the UE. The UE may receive or transmit data associated with the 5GMS service. Numerous other aspects are described.

30 Claims, 9 Drawing Sheets

(56) References Cited

OTHER PUBLICATIONS

"3rd Generation Partnership Project, Technical Specification Group Services and System Aspects, Multicast Architecture Enhancement for 5G Media Streaming (Release 17)", 3GPP TR 26.802, Mobile Competence Centre, 650, Route Des Lucioles, F-06921 Sophia-Antipolis Cedex, France, No. V17.0.0, Jun. 30, 2021, pp. 1-82, XP052029872, p. 31, paragraph 4.4.5.3-p. 33, line bottom of p. 33, paragraph 4.4.5.4 p. 52, paragraph 5.7-p. 56, paragraph 5.7.3 p. 62, paragraph 6.2.3-p. 63, line bottom of p. 63 p. 76, paragraph 7.3.4-p. 80, line bottom of p. 80.
International Search Report and Written Opinion—PCT/US2022/074845—ISA/EPO—Nov. 17, 2022.

\* cited by examiner

HYBRID 5G MEDIA STREAMING

CROSS-REFERENCE TO RELATED APPLICATION

This Patent Application claims priority to U.S. Provisional Patent Application No. 63/260,219, filed on Aug. 12, 2021, entitled "HYBRID 5G MEDIA STREAMING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for hybrid 5G media streaming.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

A method of wireless communication performed by a user equipment (UE) may include receiving an indication that a 5G media streaming (5GMS) service is partially available over a 5G multicast/broadcast service (5MBS); receiving information that indicates a first set of resources of the 5GMS service that are accessible or delivered via 5G unicast, and a second set of resources of the 5GMS service that are accessible or delivered via 5MBS, wherein the second set of resources are hosted on a server of the UE; and receiving or transmitting data associated with the 5GMS service.

An apparatus for wireless communication at a UE may include a memory, and one or more processors, coupled to the memory, configured to receive an indication that a 5GMS is partially available over a 5MBS; receive information that indicates a first set of resources of the 5GMS service that are accessible or delivered via 5G unicast, and a second set of resources of the 5GMS service that are accessible or delivered via 5MBS, wherein the second set of resources are hosted on a server of the UE; and receive or transmit data associated with the 5GMS service A non-transitory computer-readable medium may store a set of instructions for wireless communication, the set of instructions comprising one or more instructions that, when executed by one or more processors of a UE, cause the UE to receive an indication that a 5GMS service is partially available over 5MBS; receive information that indicates a first set of resources of the 5GMS service that are accessible or delivered via 5G unicast, and a second set of resources of the 5GMS service that are accessible or delivered via 5MBS, wherein the second set of resources are hosted on a server of the UE; and receive or transmit data associated with the 5GMS service.

An apparatus for wireless communication may include means for receiving an indication that a 5GMS service is partially available over 5MBS; means for receiving information that indicates a first set of resources of the 5GMS service that are accessible or delivered via 5G unicast, and a second set of resources of the 5GMS service that are accessible or delivered via 5MBS, wherein the second set of resources are hosted on a server of the apparatus; and means for receiving or transmitting data associated with the 5GMS service.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
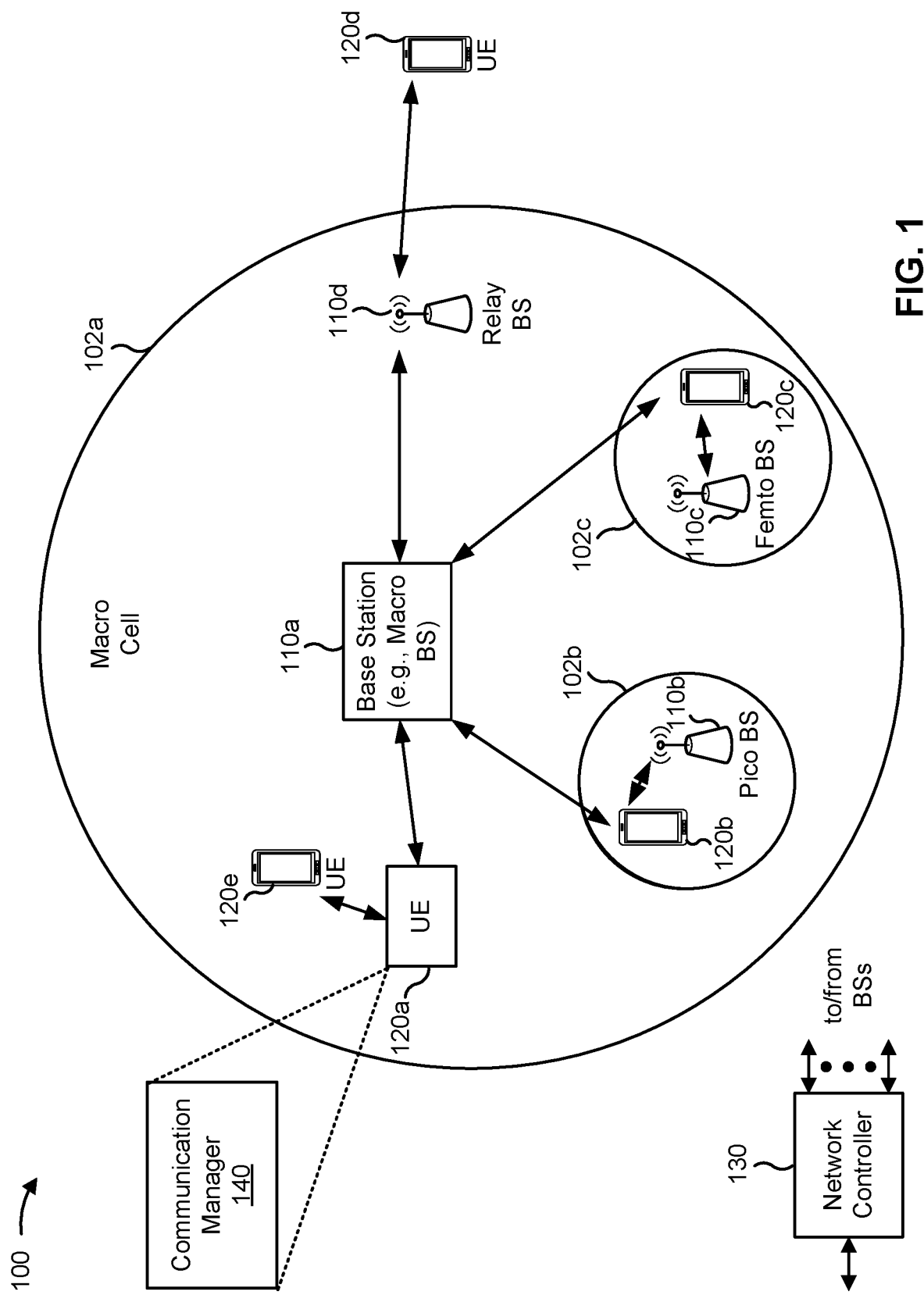
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the devices of FIG. 1 may facilitate communication with a core network such as a 5G core (5GC) or an evolved packet core (EPC). The core network may include a variety of functional entities to support services of the wireless network 100. Additionally, or alternatively, one or more functional entities described herein as part of the core network may be implemented separately from the core network. In some aspects, the core network may include an access and mobility management function (AMF), a session management function (SMF), a user plane function (UPF), a unified data management (UDM) function, a multicast/broadcast (MB) SMF (MB-SMF), an MB-UPF, an MB service transport function (MBSTF), an MB service function (MBSF), a policy charging function (PCF), and/or a network exposure function (NEF). One or more of these functions may perform functions to support a multicast/broadcast service (MBS), as described, for example, by a wireless communication specification such as one promulgated by the 3GPP. For example, the MB-SMF may handle session management, MB-UPF configuration for flow transport, interacting with the RAN to control data transport, protocol data unit (PDU) session modification, and so on. The MB-UPF may handle packet filtering, QoS enforcement, interaction with an MB-SMF to receive multicast and broadcast data, delivery of data to RAN nodes, and so on. The MBSF (if present) may support service level functionality to support MBS, interacting with an access function (AF) and MB-SMF for MBS session operations, determination of transport parameters and session transport, selection of a serving MB-SMF for an MBS session, controlling an MBSTF (if present), and determination of a sender IP multicast address for the MBS session if the IP multicast address is sourced by the MBSTF. The MBSTF may handle media anchoring for MBS data traffic, sourcing of IP multicast, generic packet transport functionalities, and multicast/broadcast delivery of input files as objects or object flows.

In some aspects, the UE 120 may include a communication manager 140. As described in more detail elsewhere herein, the communication manager 140 may receive an indication that a 5G media streaming (5GMS) service is partially available over a 5G multicast/broadcast service (5MBS); receive information that indicates a first set of resources of the 5GMS service that are accessible or delivered via 5G unicast, and a second set of resources of the 5GMS service that are accessible or delivered via 5MBS, wherein the second set of resources are hosted on a server of the UE; and receive or transmit data associated with the 5GMS service. Additionally, or alternatively, the communication manager 140 may perform one or more other operations described herein.

As indicated above, FIG. 1 is provided as an example. Other examples may differ from what is described with regard to FIG. 1.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 2:
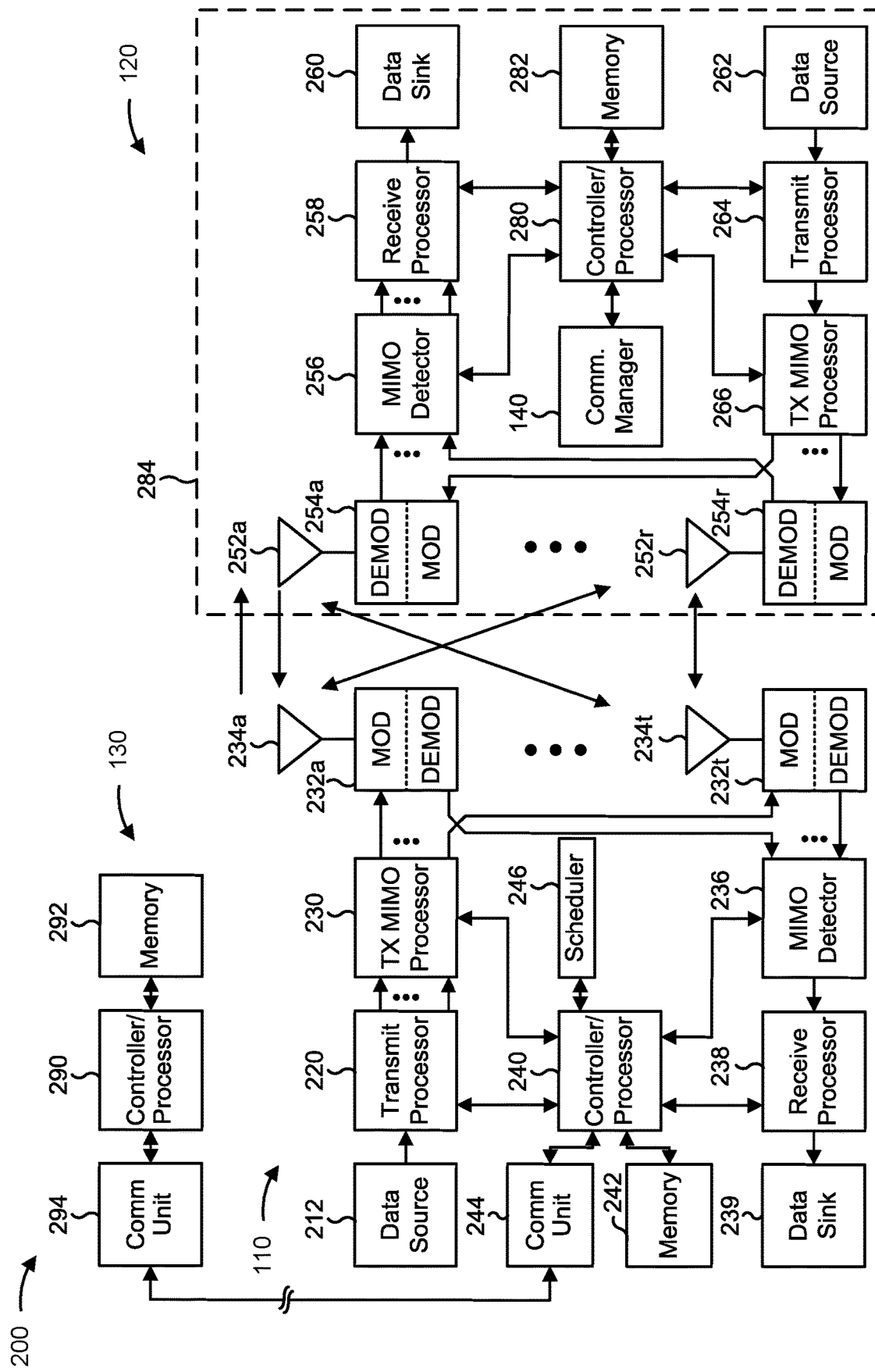
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIG. 7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIG. 7).

The controller/processor 240 of the base station 110, the controller/processor 280 of the UE 120, and/or any other component(s) of FIG. 2 may perform one or more techniques associated with hybrid 5G media streaming, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, the UE includes means for receiving an indication that a 5G media streaming (5GMS) service is partially available over a 5G multicast/broadcast service (5MBS); means for receiving information that indicates a first set of resources of the 5GMS service that are accessible or delivered via 5G unicast, and a second set of resources of the 5GMS service that are accessible or delivered via 5MBS, wherein the second set of resources are hosted on a 5GMS application server (AS) of the UE; and/or means for receiving or transmitting data associated with the 5GMS service. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A network such as a 5G network may provide access to various services. One form of service is a multicast/broadcast communication service, in which data is provided via a multicast communication or a broadcast communication to a plurality of UEs. For example, a broadcast communication service may be a communication service in which the same service and the same specific content data are provided simultaneously to all UEs in a geographical area (e.g. all UEs in the broadcast coverage area are authorized to receive the data). A multicast communication service may be a communication service in which the same service and the same specific content data are provided simultaneously to a dedicated set of UEs (e.g., not all UEs in the multicast coverage are authorized to receive the data). Another form of service is a unicast communication service, in which data is provided via a unicast session to a single UE.

There may be benefits to implementing a service using a combination of broadcast/multicast and unicast communication. For example, providing a 5G media streaming (5GMS) service using a combination of broadcast/multicast and unicast communication may enable various services and benefits including interactive service, session continuity, time-shifted viewing, targeted content replacement, reporting, unicast recovery, enhanced service quality, component replacement, and fast start-up. However, challenges may arise in the implementation of a 5GMS service using a combination of unicast and broadcast communication services, such as ambiguity in the architecture of the combination and lack of specificity regarding how such a combination can be set up and operated. This ambiguity may lead to subpar performance of services using a combination of unicast and broadcast communication services, failure of features associated with such services, and diminished throughput.

Some techniques and apparatuses described herein enable implementation of a service via a combination of unicast and broadcast communication services using a hybrid architecture, where a multicast/broadcast client application server located at the UE handles multicast/broadcast communication and a unicast application function at a data network handles unicast communication. For example, resources delivered or accessible via 5G unicast may be hosted in a data network, and resources deliverable over multicast/broadcast may be hosted and provided on a server (such as a 5GMS application server) that is included in a multicast/broadcast service (MBS) (such as a 5G MBS (5MBS)) client of the UE. While the techniques described herein are primarily described with regard to 5MBS, these techniques can also be applied for other forms of MBS, such as evolved multimedia broadcast and multicast services (eMBMS).

A 5GMS Service may be provisioned to distribute content partially over a 5G unicast and partially over 5MBS. An indication (e.g., a streaming manifest) may be provided that indicates resources delivered or being made accessible via 5G unicast and the data is hosted on a 5GMS AS in a data network, and that indicates resources that are delivered over 5MBS and are hosted and provided on a server (such as a 5GMS AS) that is included in a 5MBS client. A 5GMS Client, such as a media session handler, may be informed by a 5GMS service announcement that the 5GMS service is hybrid (e.g., partially available over 5MBS). In some aspects, for being able to access all resources, an 5MBS User service may be accessed. In some other aspects, the full service is available on unicast, and the service is also available on 5MBS, and the client may be requested or offered to use 5MBS for capacity enhancement and/or improved user experience. Other cases for offering content on unicast and delivering over MBS are possible.

A UE may include a 5GMS client and a 5MBS client, and there may be data exchange between the two entities in order to instruct or support a media player to access content either from the server (e.g., 5GMS AS) on the UE or from the 5GMS AS in the DN. The policies on where and when to access the data may change based at least in part on use cases and setup. In some aspects, the streaming manifest may be a dynamic adaptive streaming over HTTP media presentation description (DASH MPD) or a hypertext transfer protocol live streaming (HLS) playlist file, such as an M3U8, among other examples.

Thus, the techniques and apparatuses described herein provide an architecture for 5G media streaming by providing a description and architecture of 5GMS hybrid unicast/broadcast services. Thus, the techniques and apparatuses described herein enable benefits and features achievable using a hybrid service, such as interactive service, session continuity, time-shifted viewing, targeted content replacement, reporting, unicast recovery, enhanced service quality, component replacement, and fast start-up.

In some aspects, resources delivered over 5G unicast may be identical to resources delivered over MBS (e.g., 5MBS or MBMS). In some aspects, a resource delivered over 5G unicast may differ from a resource delivered over MBS with regard to at least one parameter. For example, the parameter may include an encoding method (e.g., an encoding scheme used to encode the resource), a horizontal visual presentation size, a vertical visual presentation size, a picture aspect radio, a data rate of delivery of the resource, a duration of a media presentation, an audio language, a caption, a parental rating, a quality of service parameter associated with the resource, an availability start time, a content protection parameter, a media content component, a charging policy, a targeted advertisement parameter (e.g., targeted advertisement content may be provided via unicast and other content may be provided via MBS), or a regional replacement content parameter (e.g., regional replacement content may be provided via unicast and other content may be provided via MBS).

Figure 3:
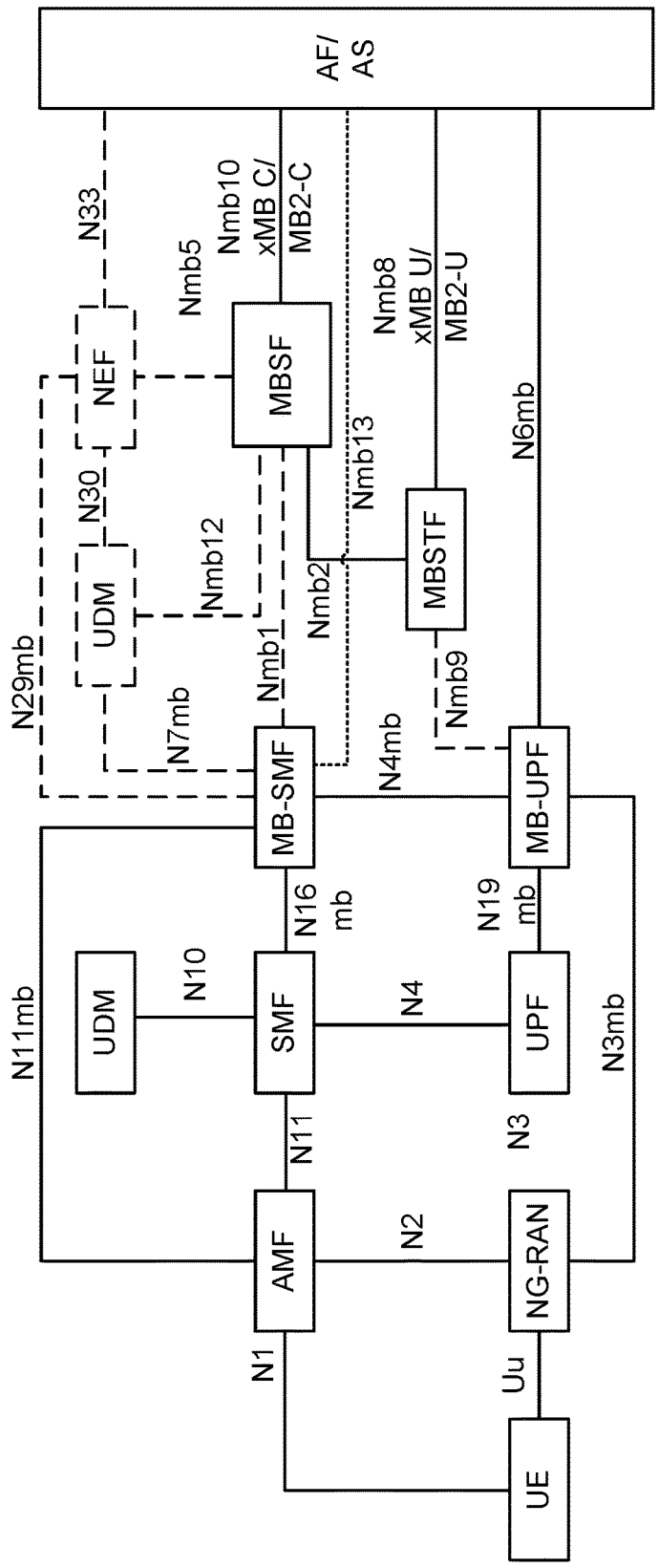
FIG. 3 is a diagram illustrating an example of a system architecture associated with user service 5MBS, in accordance with the present disclosure.

FIG. 3 is a diagram illustrating an example 300 of a system architecture associated with user service 5G MBS, in accordance with the present disclosure. As shown, example 300 includes an application function or application server (AF/AS), a multicast-broadcast service function (MBSF), and a multicast-broadcast service transport function (MB-STF). As shown, an Nmb8, xMB-U, and/or MB2-U interface may be provided between the MBSTF and the 5MBS application provider, terminating at an application programming interface (API) exposed by the MBSTF. As further shown, an interface designated Nmb10, xMB-C, and/or MB2-C may be provided between the 5MBS application provider and the MBSF, terminating at an API at the MBSF. As shown, an interface designated Nmb2 may be provided between the MBSF and the MBSTF. As further shown, an interface designated Nmb9 may be provided between the MBSTF and an MB user plane function (MB-UPF). The MBSF and the MBSTF offer service layer functionality for sending data via MBS sessions. The MBSF offers control plane (CP) functionality while the MBSTF offers user plane functionality. The MBSTF may also act as a user plane anchor when sourcing IP multicast traffic.

The MBSF may receive provisioning and control commands. The MBSF may invoke MBS session operations at an MB session management function (MB-SMF). The MBSF may configure the MBSTF. The MBSF may provide session access information consumed by an MBS client and used to discover and initiate reception of one or more MBS user services. The MBSF may also perform various control plane functionalities to support MBS user services. The MBSTF may receive user plane data, and may transmit MBS data packets to the MB-UPF. The MBSTF may also receive MBS distribution session configurations, transmit notifications to the MBSF (e.g., data ingest failure, session terminated, delivery started), deliver ingested objects or sequences of objects, deliver ingested packet streams, and/or deliver user service announcement information.

As further shown, the example 300 may include a UE (e.g., UE 120), an NG-RAN (e.g., one or more devices of wireless network 100 such as base station 110), an AMF, a UPF, an SMF, a UDM, an MB-UPF, an MB-SMF, a UDM, and a NEF.

The AMF includes one or more devices that act as a termination point for non-access stratum (NAS) signaling and/or mobility management, among other examples. The SMF includes one or more devices that support the establishment, modification, and release of communication sessions in the wireless telecommunications system. For example, the SMF may configure traffic steering policies at the UPF and/or may enforce UE network address allocation and policies, among other examples. In some aspects, the SMF may provide protocol configuration option (PCO) messaging to the UE based at least in part on information received from one or more other network entities. The UPF includes one or more devices that serve as an anchor point for intra-RAT and/or inter-RAT mobility. The UPF may apply rules to packets, such as rules pertaining to packet routing, traffic reporting, and/or handling user plane quality of service (QoS), among other examples. The UDM includes one or more devices that store user data and profiles. The UDM may be used for fixed access and/or mobile access. The MB-UPF and the MB-SMF may perform user plane functions and session management functions for multicast/broadcast communications. The NEF includes a device that securely exposes services and capabilities provided by network functions of the network.

As indicated above, FIG. 3 is provided as an example. Other examples may differ from what is described with regard to FIG. 3.

Figure 4:
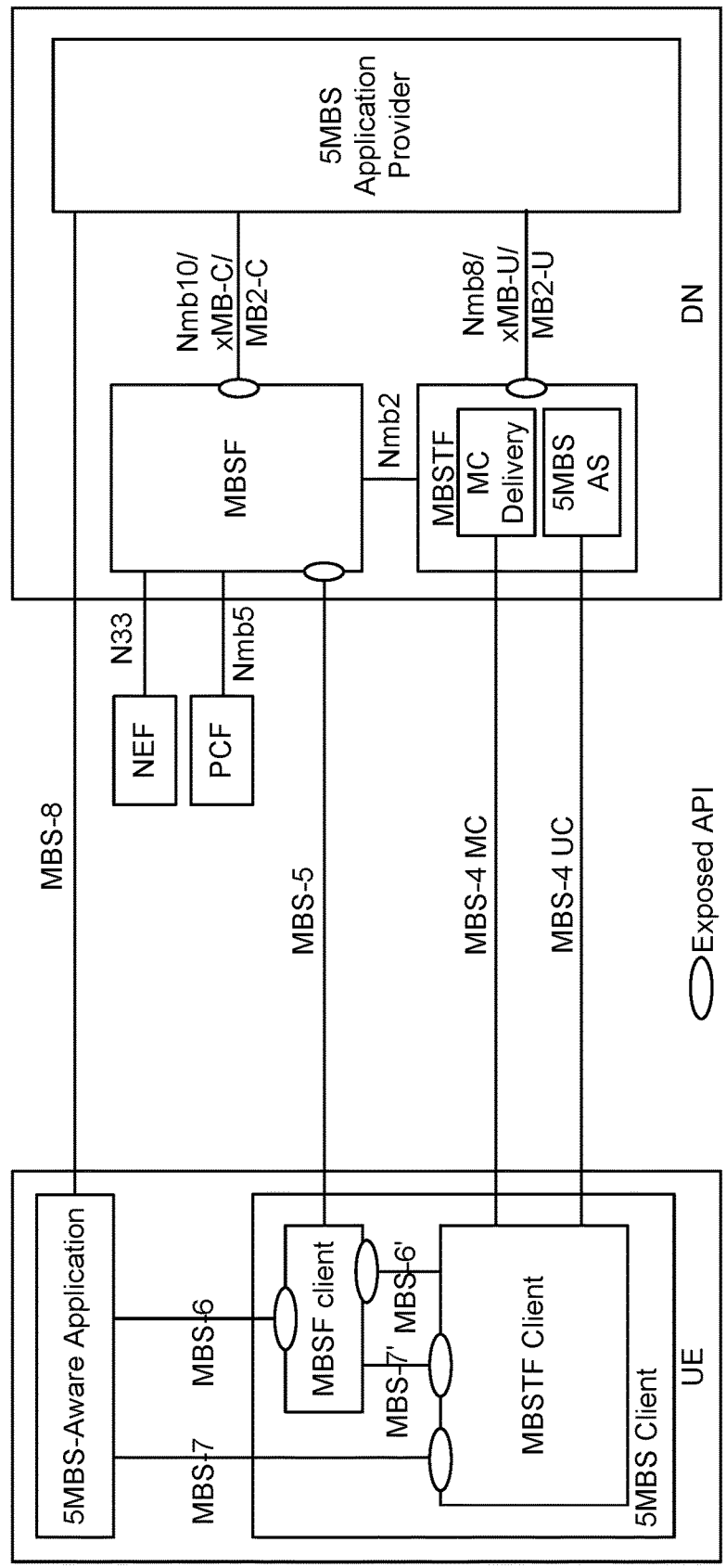
FIG. 4 is a diagram illustrating an example of a 5G multicast/broadcast service (5MBS) user service architecture, in accordance with the present disclosure.

FIG. 4 is a diagram illustrating an example 400 of a 5MBS user service architecture, in accordance with the present disclosure. As shown, example 400 includes a UE (e.g., UE 120) and a data network (DN). The UE includes (e.g., runs) a 5MBS client and a 5MBS-aware application. The 5MBS client includes an MBSF client and an MBSTF client. The DN includes an MBSF and an MBSTF. The MBSTF includes an MC delivery component and a 5MBS AS. Furthermore, the DN may include or be associated with a 5MBS application provider. The MBSF client may communicate with the MBSF on MBS user service control aspects. The MBSTF client may communicate with the MBSTF and/or a server, such as a 5MBS AS, in order to provide an MBS application data session to a 5MBS-aware application. A 5MBS-aware application is an application that triggers establishment of an MBS user services session. The MBSF client and the MBSTF client may be collectively referred to as an MBS client or a 5MBS client.

As shown, interfaces may be provided between the components of example 400. For example, an MBS-7 interface may be provided between the 5MBS-aware application and the MBSTF client, terminating at an API exposed by the MBSTF client. For example, an MBS-7' interface may be provided between the MBSF client and the MBSTF client, terminating at an API exposed by the MBSTF client. For example, an MBS-6' interface may be provided between the MBSF client and the MBSTF client, terminating at an API exposed by the MBSF client. For example, an MBS-5 interface may be provided between the MBSF client and the MBSF, terminating at an API exposed by the MBSF. For example, an MBS-4-MC interface (e.g., a file-based unicast repair interface) may be provided between the MBSF client and the MC delivery component. For example, an MBS-4-UC interface (e.g., for unidirectional multicast distribution of content from the MBSTF to the MBS client) may be provided between the 5MBS AS and the MBSTF client.

As indicated above, FIG. 4 is provided as an example. Other examples may differ from what is described with regard to FIG. 4.

Figure 5:
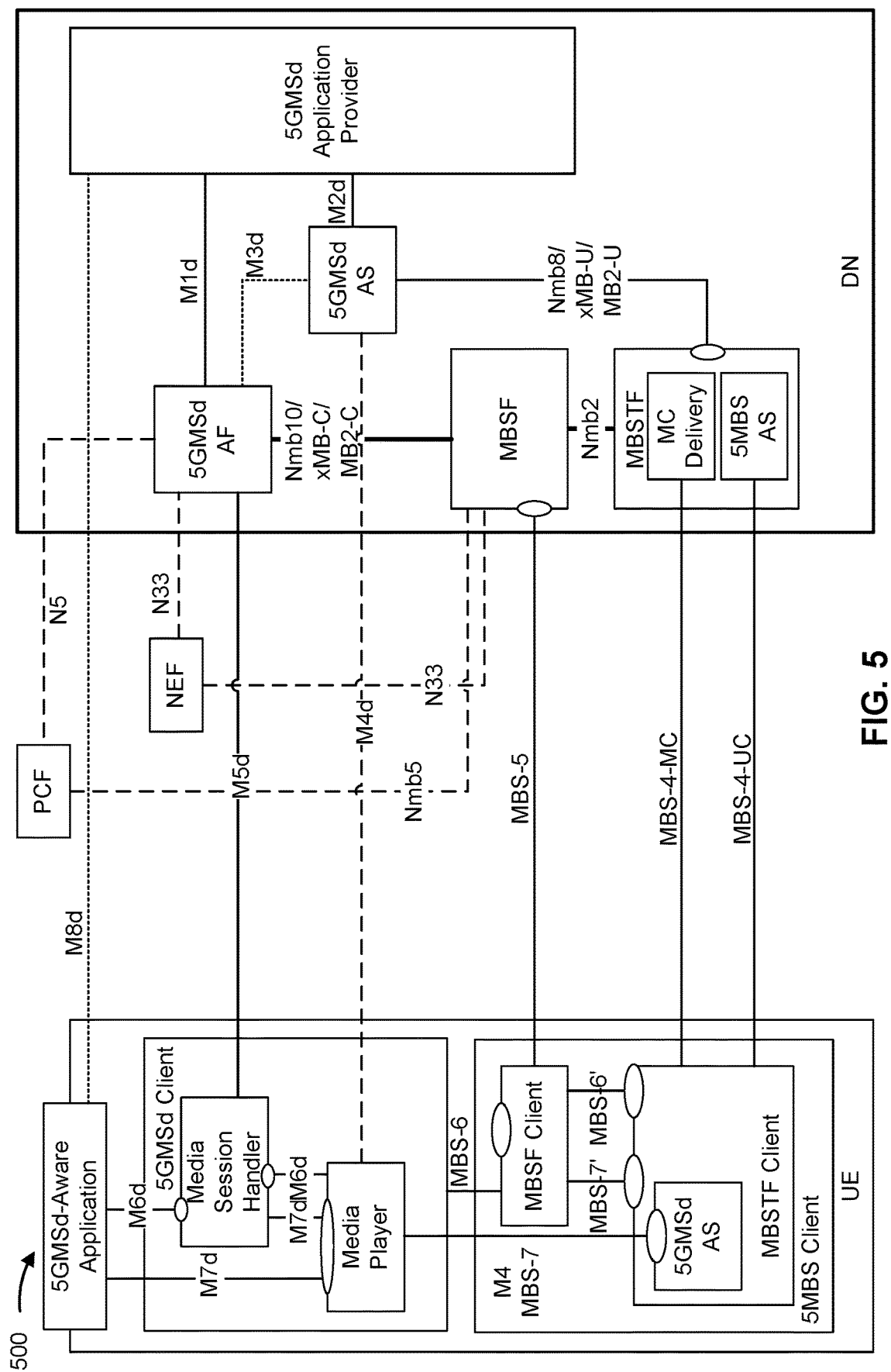
FIG. 5 is a diagram illustrating an example of an architecture for 5G media streaming via 5MBS.

FIG. 5 is a diagram illustrating an example 500 of an architecture for 5G media streaming via 5MBS. As shown, example 500 includes a UE (e.g., UE 120) and a data network (DN). The UE includes (e.g., runs) a 5G media streaming downlink (5GMSd) client, a 5MBS client, and a 5GMSd-aware application. The 5GMSd client includes a media session handler and a media player. The 5MBS client includes an MBSF client and an MBSTF client. The MBSTF client includes a server, shown as a 5GMSd AS (sometimes referred to herein as a 5GMS AS, a local server, or a local 5GMS AS).

The DN includes a 5GMSd AF, a 5GMSd AS, an MBSF, and an MBSTF. The MBSTF includes an MC delivery component and a 5MBS AS. Furthermore, the DN may include or be associated with a 5GMSd application provider.

In some aspects, the architecture may include multiple (e.g., physical) servers, such as multiple media servers, multiple 5GMSd ASs, and/or multiple 5MBS ASs. Different servers or different groups of servers may be addressed with different network addresses (such as different fully qualified domain names (FQDNs)). The UE (e.g., a client of the UE) may be informed of the different network addresses via a manifest. For example, the manifest may list multiple base uniform resource locators (URLs). In this case, the servers may be managed by the same party or by different parties (such as a mobile network operator (MNO), a 5GMSd application provider, or a combination thereof). Thus, a hybrid service can be provided via unicast and 5MBS. In some aspects, the architecture may include a single server. In some aspects, the single server may be addressed with a single FQDN. For example, an MNO AS may act as a proxy or cache for the single server, which provides for provision of a service via 5MBS without unicast.

Figure 6A:
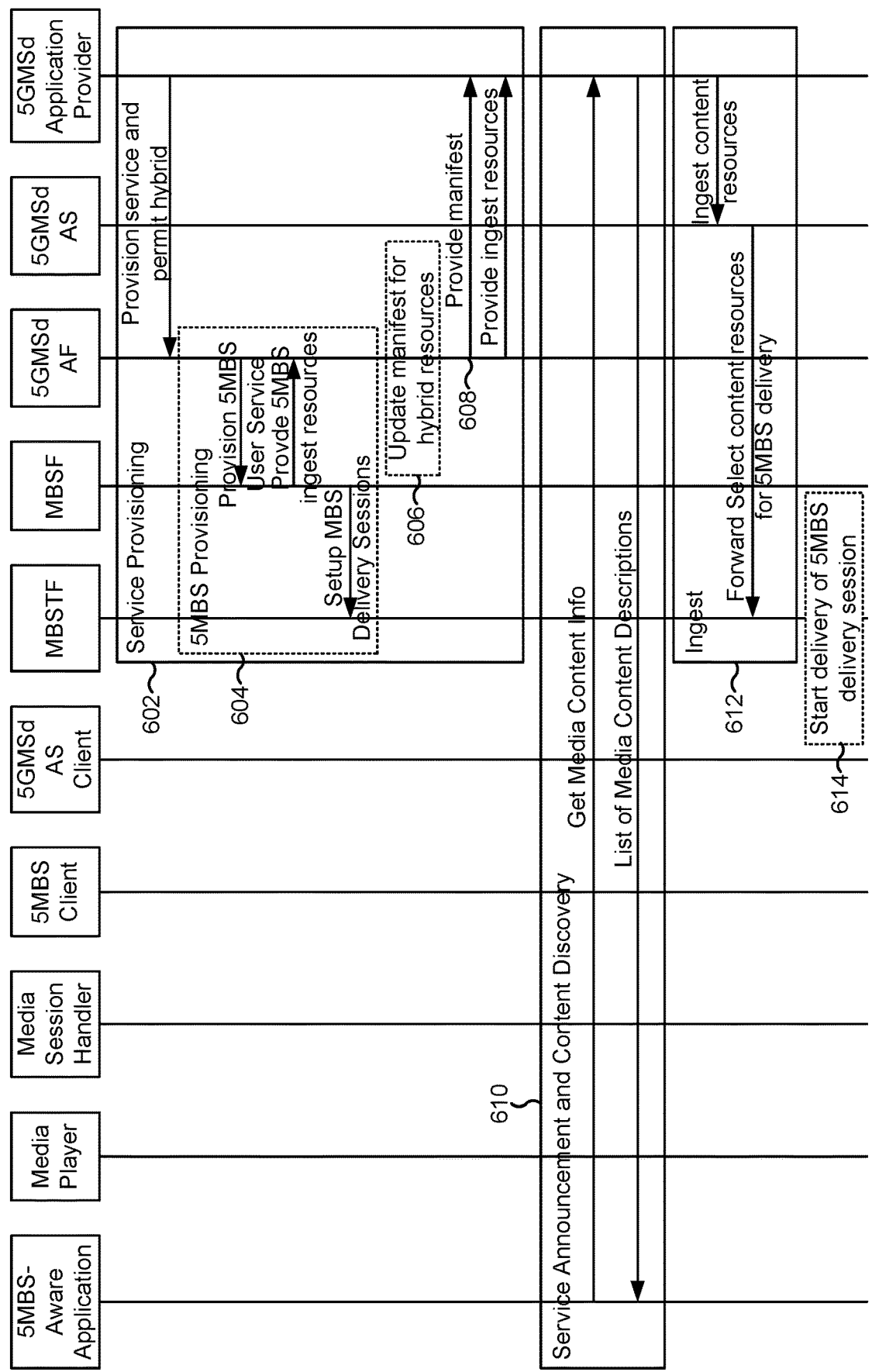
FIGS. 6A and 6B are diagrams illustrating examples of a call flow for delivery of 5G media streaming (5GMS) media using unicast and 5MBS, in accordance with the present disclosure.
Figure 6B:
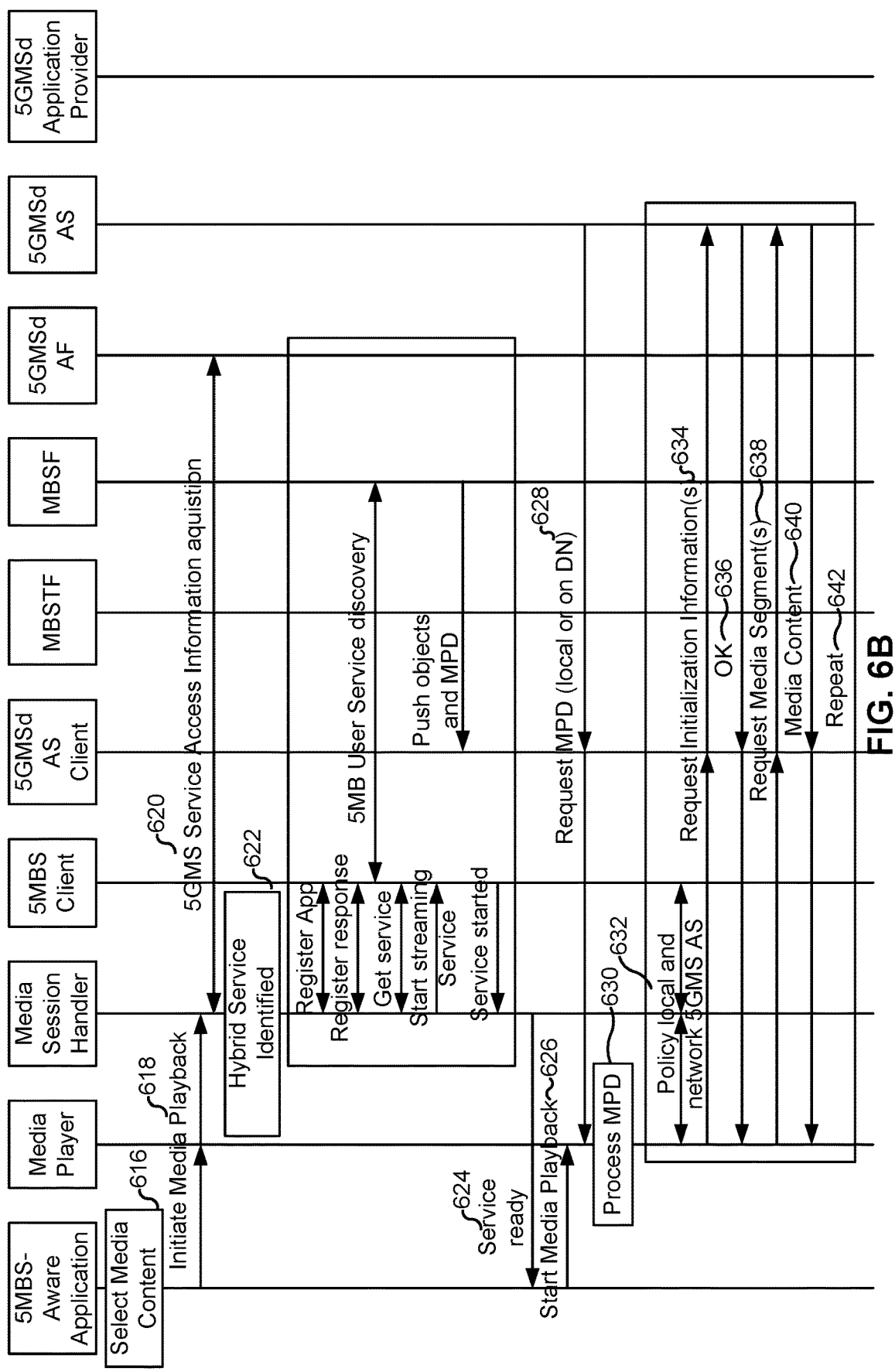

FIGS. 6A and 6B are diagrams illustrating examples of a call flow for delivery of 5GMS media using unicast and 5MBS, in accordance with the present disclosure. The example of FIGS. 6A and 6B includes a 5G media streaming downlink (5GMSd) aware application, a media player, a media session handler, a 5MBS client, a 5GMSd AS client (e.g., a server such as a 5GMSd AS at a UE 120), an MBSF, a 5GMSd AF, a 5GMSd AS, and a 5GMSd application provider.

As shown by reference number 602, the 5GMSd-aware application may trigger service provisioning and permits hybrid distribution of the media content. For example, the 5GMSd application provider may provision the service at the 5GMSD AF.

As shown by reference number 604, the 5GMS AF may provision a 5MBS user service by communicating with the MBSF. As shown, the MBSF may set up the MBS delivery sessions (e.g., at the MBSTF) and may inform the 5GMS AF on ingest resources. For example, the MBSF may provide information setting up MBS delivery sessions at the MBSF, and may provide 5MBS ingest resources to the 5GMSd AF.

As shown by reference number 606, the 5GMS AF provider may modify (e.g., update) a manifest (e.g., a streaming manifest) to provide resources (e.g., the 5MBS ingest resources, the media content) as available either on a DN or on a 5MBS hosted 5GMS AS (e.g., a local server). Thus, the UE may receive information that indicates a first set of resources of a 5GMS service that are accessible or delivered via 5G unicast (e.g., on a DN), and a second set of resources of the 5GMS service that are accessible or delivered via 5MBS (e.g., via the 5MBS hosted 5GMS AS). At reference number 608, the manifest and the 5MBS ingest resources may be provided to the 5GMS application service provider by the 5GMSd AF. In some aspects, the manifest may also be updated by the 5GMSd application provider.

At reference number 610, the media content may be announced to the 5GMSd-aware application and the 5GMSd-aware application may request the entry points for the service. For example, the 5GMSd-aware application may request media content information from the 5GMSd application provider, and the 5GMSd application provider may provide a list of media content descriptions (which may include a list of entry uniform resource indicators (URIs) with metadata).

At reference number 612, ingest may start from the 5GMSd application provider. The 5GMS AS may forward (e.g., directly) selected content resources to the MBSTF. At reference number 614, the MBSTF may start one or more MBS delivery sessions. Different modes may be used based at least in part on whether the one or more MBS delivery sessions are a multicast session or a broadcast session.

At reference number 616 of FIG. 6B, the media content may be selected by the 5GMSd-aware application. At reference number 618, the 5GMSd-aware application may initiate the media playback through the media player and the media session handler. At reference number 620, the media session handler optionally requests the service access information from the 5GMS AF.

At reference number 622, the media session handler may identify a hybrid service. Based at least in part on identifying the hybrid service, the media session handler initiates 5MBS user service reception and starts the service. For example, the media session handler and the 5MBS client may register the 5GMSd-aware application (and may provide a register response). The 5MBS client and the MBSF may perform user discovery. The media session handler and the 5MBS client may obtain the streaming service. The media session handler may provide an indication to start a streaming service. The 5MBS client may provide an indication that service has started.

At reference number 624, the media session handler may inform the 5GMSd-aware application that the service is ready. At reference number 626, the 5GMSd-aware application may start media playback. At reference number 628, the media player may request a media presentation description (MPD) and/or the manifest. The manifest may be on the local 5GMS AS (populated by the 5MBS delivery), on the 5GMS AS on the DN, or on both the local 5GMS AS and the 5GMS AS on the DN.

At reference number 630, the media player may process the MPD and determine that resources (e.g., the 5GMS ingest resources) are available on a different 5GMS AS, such as a 5GMSd AS associated with the data network and a 5GMSd AS of the UE. At reference number 632, the media player may determine whether 5MBS user service data is available. For example, the media player may check with the media session handler regarding how to use the content. This may be based at least in part on the hybrid scenario. In some aspects, the media session handler may forward a request regarding whether 5MBS user service data is available to the 5MBS client. In some aspects, the media player may continuously determine whether 5MBS user service is available.

At reference number 634, the media player requests initialization information from the local 5GMS AS (e.g., 5GMSd AS) or a remote 5GMS AS. In some aspects, the media player may repeat this step for each required initialization segment. At reference number 636, the media player receives the initialization information. At reference number 638, the media player requests one or more media segments according to the MPD either from local or remote 5GMS AS. At reference number 640, the media player receives media segments and puts the information into the appropriate media rendering pipeline. Thus, the UE receives or transmits data associated with the 5GMS service. At reference number 642, the operations associated with reference numbers 634, 636, 638, and 640 are repeated according to the MPD information.

Various features supported by delivery of 5GMS media using unicast and MBS are described below. These features are implemented using various interfaces, which are illustrated in FIG. 5. An action performed via an interface may be performed by either function, of a first function and a second function, associated with the interface. A reference to an interface also discloses a reference to the corresponding downlink interface. For example, a reference to an M6 interface discloses an M6d interface.

In some aspects, delivery of 5GMS media using unicast and MBS may support fast startup via unicast while the 5MBS slient is waiting for initial multicast/broadcast packets to start arriving via MBS-4. In this scenario, fast start-up representations may be available on the 5GMS AS for early access. Furthermore, the media player may switch to 5MBS distribution once the same content is available on unicast. General provisioning and a fast startup feature may be provisioned via an M1 interface. General ingest and signaling of unicast fast start-up representations in a presentation manifest may be provisioned via an M2 interface. Signaling of the unicast available content and the content available on 5MBS in the manifest may be performed via an M4 interface. Signaling availability of unicast fast start-up representations in the manifest may be performed. Identification of content for 5MBS distribution may be performed via an Nmb2 interface. Ingest of content by the MBSTF for 5MBS distribution may be performed via an Nmb4 and/or xMB-U interface. Potential usage of dynamic policies and/or network assistance for unicast fast start-up representations may be performed via an M4 interface. 5BMS object delivery of non-fast-start up representations may be performed via an MBS-4-MC interface. Announcement of non-fast-start up representations by the 5MBS client may be performed via an MBS-6 interface. Provision of the non-fast-start up representations from the 5MBS Client may be performed via an MBS-7 interface.

In some aspects, delivery of 5GMS media using unicast and MBS may support unicast recovery of the application payload data carried in multicast/broadcast packets that are not successfully received via MBS-4, in a manner that is transparent to the 5GMS client. In this scenario, unicast URLs associated with the unicast recovery may be announced to the 5MBS client. General provisioning may be performed via an M1 interface. General ingest may be performed via an M2 interface. Service announcement including signaling of unicast repair server may be performed via an MBS-5 interface. Identification of content for 5MBS distribution may be performed via an Nmb2 interface. Ingest of content by the MBSTF for 5MBS distribution may be performed via an Nmb4 and/or xMB-U interface. 5MBS object delivery of content representations may be performed via an MBS-4-MC interface. File repair may be performed via an MBS-4-UC interface. Partial file delivery in case repair fails or delivery timeline is expired may be performed via an MBS-7 interface.

In some aspects, delivery of 5GMS media using unicast and MBS may support session continuity when an MBS is temporarily unavailable, in a manner that is transparent to the 5GMSd-aware application. In this scenario, a 5MBS client may inform the media player of the (non-)availability of the MBS and of resources through 5MBS distribution. The MBS may be compatible with low-latency DASH. A session-continuity feature may be provisioned via an M1 interface. Ingest of content by the 5GMS AS may occur via an M2 interface. Signaling availability of different content on different delivery means in the manifest, on 5GMS AS and on 5MBS, may occur via an M4 interface. Identification of content for 5MBS distribution may be performed via an Nmb2 interface. Ingestion of content for 5MBS distribution may be performed via an Nmb4 and/or xMB-U interface. Signaling of identical and alternative content may be performed via an MBS-5 interface. 5MBS object delivery of content representations may be performed via an MBS-4-MC interface. File repair for session continuity for a given amount of time may be performed via an MBS-4-UC interface. Dynamic switching of the media player from 5MBS content to unicast content (sometimes referred to as a panic button) when unicast repair starts to fail may be performed via an MBS-7 interface. Availability information regarding 5MBS distribution may be performed via an MBS-6 and/or M6 interface. In this case, an entire media presentation may be provided on the 5GMS AS in the data network. In addition, for each common media application format (CMAF) switching set in the manifest, one track is provided on 5MBS. The MBSF may inform the 5GMS to use the resources provided on 5MBS, if 5MBS is accessible. If 5MBS is unavailable, the unicast version may be used. The unavailability may occur because 5MBS is not supported in the network or on the client, or because the 5MBS service is not in coverage.

In some aspects, delivery of 5GMS media using unicast and MBS may support enhanced service quality for which content quality of a service is enhanced by additional unicast signaling (e.g., through scalable coding, layered coding, or equivalent means). In this scenario, the 5MBS client may support the retrieval of components from 5MBS and unicast at the same time, and the service may support low-latency DASH. General provisioning and enhanced service quality feature may be provisioned via an M1 interface. General Ingest including of enhanced quality content ingest by 5GMS AS may be performed via an M2 interface. Signaling availability of different content on different delivery means in the manifest, on 5GMS AS and on 5MBS, may be performed via an M4 interface. Identification of content for 5MBS distribution may be performed via an Nmb2 interface. Ingest of content by the MBSTF for 5MBS distribution may be performed via an Nmb4 and/or xMB-U interface. 5MBS distribution of content representations may be performed via an MBS-4-MC interface. Unicast distribution of enhanced service quality may be performed via an M4 interface. Optional use of dynamic policy and network assistance on unicast distribution may be performed via an M5 interface.

In some aspects, delivery of 5GMS media using unicast and MBS may support component replacement. For example, a component provided over a 5MBS session may be replaced by a unicast component. In this scenario, the 5MBS client may support the retrieval of components from 5MBS and unicast at the same time, and the service may support low-latency DASH. General provisioning and provisioning of a component replacement feature may be performed via an M1 interface. Ingest of replacement content by the 5GMS AS may be performed via an M2 interface. Signaling availability of different content on different delivery means in the manifest, on the 5GMS AS and on the 5MBS, may be performed via an M4 interface. Identification of content for 5MBS distribution may be performed via an Nmb2 interface. Ingest of content by the MBSTF for 5MBS distribution may be performed via an Nmb4 and/or xMB-U interface. 5MBS object delivery of content representations may be performed via an MBS-4-MC interface. Unicast distribution of a replacement component may be performed via an M4 interface. Optional use of dynamic policy and network assistance on unicast distribution may be performed via an M5 interface.

In some aspects, delivery of 5GMS media using unicast and MBS may support time-shifted viewing (e.g., in which a 5GMSd client determines to access the service in a time-shift mode and hence switches to unicast distribution). In this scenario, the transition to the time-shifted viewing should be seamless (e.g., in a way that a user is not aware that the delivery mode is changed). A time-shifted viewing feature may be provisioned via an M1 interface. Ingest of time-shifted content may be performed via an M2 interface. Signaling of availability of different content on different delivery means in the manifest, on the 5GMS AS and on the 5MBS, may be performed via an M4 interface. Identification of content for 5MBS distribution may be performed via an Nmb2 interface. Ingest of content by the MBSTF for 5MBS distribution may be performed via an Nmb4 and/or xMB-U interface. 5MBS object delivery of content representations may be performed via an MBS-4-MC interface. Distribution of time-shifted content may be performed via an M4 interface. In some aspects, an entire media presentation is provided on the 5GMS AS in the data network. In addition, for each CMAF switching set in the manifest, one track may be provided on 5MBS. If the client consumes the information in time shift and the resources are not available on the 5GMS AS on the client, the media player may switch to unicast.

In some aspects, delivery of 5GMS media using unicast and MBS may support targeted content replacement, for example, for advertisement insertion (e.g., targeted to users, regions, etc.). In this scenario, the transition to the replacement content should be seamless (e.g., in a way that a user is not aware that the transition has occurred). Replacement content via unicast may be provisioned via an M1 interface. Ingest of replacement content may occur via an M2 interface. Signaling of availability of different content on different delivery means in the manifest, on the 5GMS AS and on the 5 MB S, may be performed via an M4 interface. Identification of content for 5MBS distribution may be performed via an Nmb2 interface. Ingest of content by the MBSTF for 5MBS distribution may be performed via an Nmb4 and/or xMB-U interface. 5MBS distribution of live main content may be performed via an MBS-4-MC interface. Distribution of targeted unicast content for replacement may be performed via an M4 interface. Optional use of dynamic policy and network assistance on unicast distribution may be performed via an M5 interface. In some aspects, an entire media presentation is provided on the 5GMS AS in the data network. In addition, for each CMAF switching set in the manifest, one track may be provided on 5MBS. For a specific period in the content, an alternative may be available. The media player may select this alternative and replace the content by content available on the AS in the data network.

In some aspects, delivery of 5GMS media using unicast and MBS may support reporting for an MBS service. A Reporting feature may be provisioned via an M1 interface. Identification of content for 5MBS distribution may be performed via an Nmb2 interface. Ingest of content by the MBSTF for 5MBS distribution may be performed via an Nmb4 and/or xMB-U interface. 5MBS object delivery of content may be performed via an MBS-4-MC interface. Reporting may be performed via an M5 interface.

In some aspects, delivery of 5GMS media using unicast and MBS may support an interactive service, for example, with a presentation layer being included. Interactive content distribution may be provisioned via an M1 interface. Ingest of interactive content may be performed via an M2 interface. Identification of content for 5MBS distribution may be performed via an Nmb2 interface. Content may be announced through the interactive application via an M8 interface. Presentation layer content, that includes reference to multiple content items delivered over 5MBS, may be delivered via an M4 interface. Identification of the content on 5MBS may be performed via one or more of an M6 interface, an M7 interface, or an MBS-6 interface. Ingest of content by the MBSTF for 5MBS distribution may be performed via an Nmb4 and/or xMB-U interface. 5MBS object delivery of content may be performed via an MBS-4-MC interface. In this case, streaming may be provided exclusively over 5MBS. The 5GMS AS on the network may be used (e.g., only) to host resources related to the interactive presentation. The 5GMS AS may also be used for digital rights management (DRM) related exchanges.

As indicated above, FIGS. 6A and 6B are provided as an example. Other examples may differ from what is described with regard to FIGS. 6A and 6B.

Figure 7:
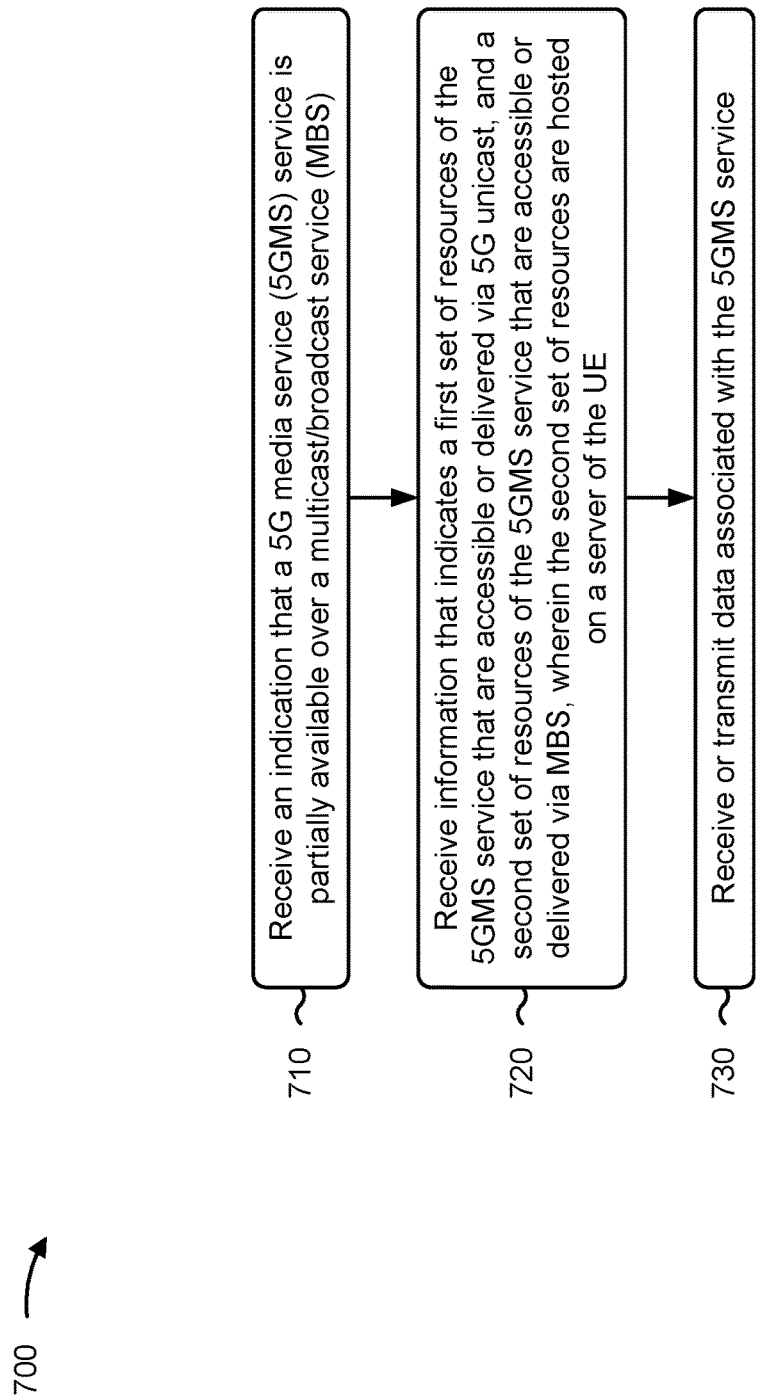
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with a hybrid 5G streaming service.

As shown in FIG. 7, in some aspects, process 700 may include receiving an indication that a 5GMS service is partially available over a MBS (block 710). For example, the UE (e.g., using communication manager 140 and/or reception component 802, depicted in FIG. 8) may receive an indication that a 5GMS service is partially available over a MBS, such as 5MBS or MBMS, as described above. In some aspects, the indication is a streaming manifest.

As further shown in FIG. 7, in some aspects, process 800 may include receiving information that indicates a first set of resources of the 5GMS service that are accessible or delivered via 5G unicast, and a second set of resources of the 5GMS service that are accessible or delivered via the MBS, wherein the second set of resources are hosted on a server of the UE (block 720). For example, the UE (e.g., using communication manager 140 and/or reception component 802, depicted in FIG. 8) may receive information that indicates a first set of resources of the 5GMS service that are accessible or delivered via 5G unicast, and a second set of resources of the 5GMS service that are accessible or delivered via MBS, wherein the second set of resources are hosted on a server (e.g., a 5GMS AS, a 5GMSd AS, a proxy server) of the UE, as described above. The server may include a 5GMSd AS of an MBSTF client, as described in connection with FIG. 5.

As further shown in FIG. 7, in some aspects, process 700 may include receiving or transmitting data associated with the 5GMS service (block 730). For example, the UE (e.g., using communication manager 140 and/or reception component 802 or transmission component 804, depicted in FIG. 8) may receive or transmit data associated with the 5GMS service, as described above, for example, in connection with reference number 640 of FIG. 6B.

Process 700 may include additional aspects, such as any single aspect or any combination of aspects described below and/or in connection with one or more other processes described elsewhere herein.

In a first aspect, the server is included in a 5MBS client of the UE.

In a second aspect, alone or in combination with the first aspect, the UE includes a 5GMS client, and process 700 includes accessing the first set of resources via 5G unicast over a data network using the 5GMS client, and accessing the second set of resources via 5MBS using the 5MBS client.

In a third aspect, alone or in combination with one or more of the first and second aspects, accessing the first set of resources and accessing the second set of resources is based at least in part on a policy associated with a use case or a configuration associated with the 5GMS service.

In a fourth aspect, alone or in combination with one or more of the first through third aspects, process 700 includes receiving data of the first set of resources from a 5GMS on a data network.

In a fifth aspect, alone or in combination with one or more of the first through fourth aspects, the indication is received by a media session handler of a 5GMS client of the UE, and the indication is received in a 5GMS service announcement.

In a sixth aspect, alone or in combination with one or more of the first through fifth aspects, the second set of resources is accessible or delivered only via a 5MBS user service.

In a seventh aspect, alone or in combination with one or more of the first through sixth aspects, receiving or transmitting data associated with the 5GMS service further comprises receiving or transmitting data via 5G unicast and via 5MBS.

In an eighth aspect, alone or in combination with one or more of the first through seventh aspects, the indication is a streaming manifest.

In a ninth aspect, alone or in combination with one or more of the first through eighth aspects, the streaming manifest is a dynamic adaptive streaming over HTTP media presentation description.

In a tenth aspect, alone or in combination with one or more of the first through ninth aspects, the streaming manifest is a hypertext transfer protocol live streaming playlist file.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
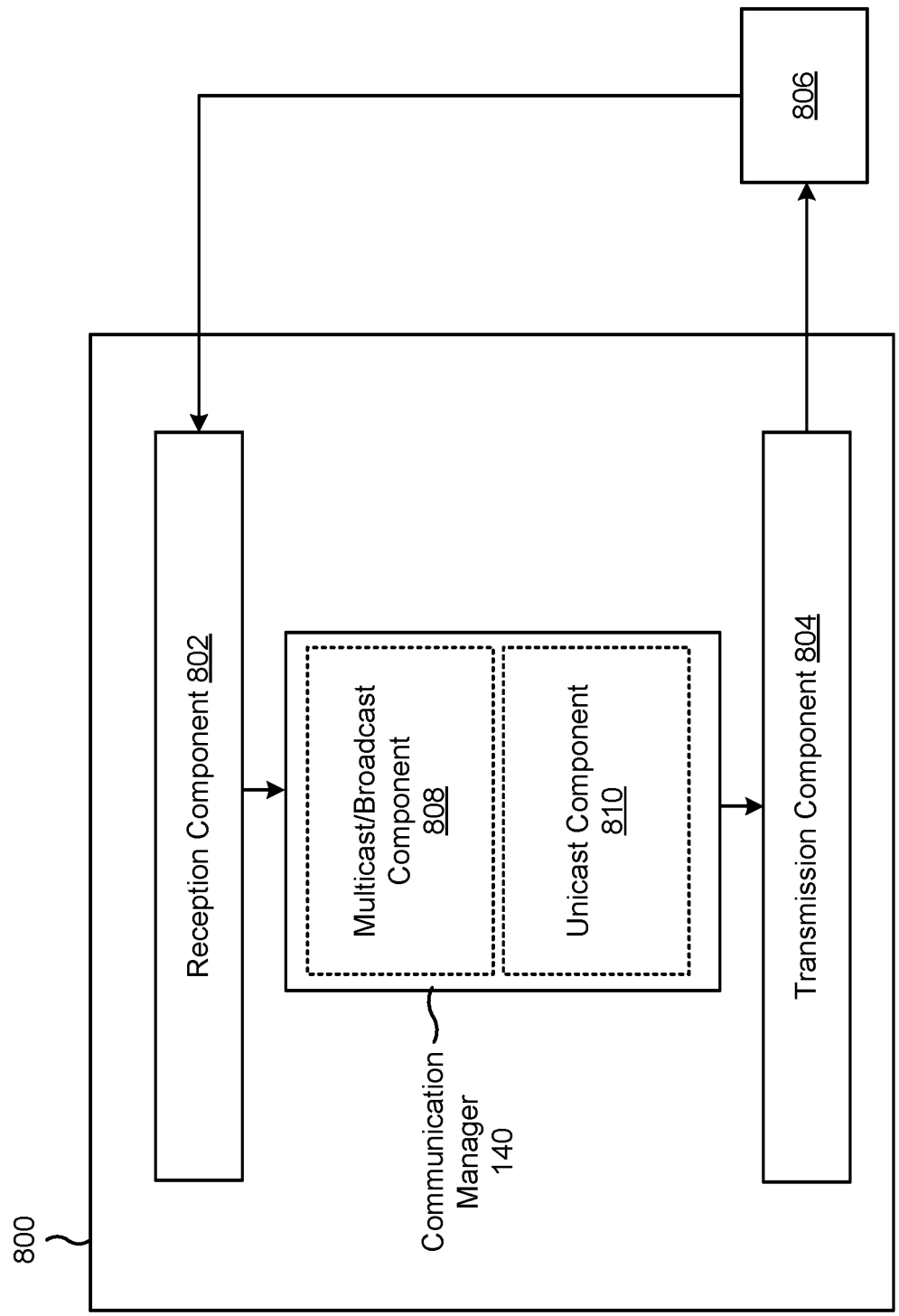
FIG. 8 is a diagram of an example apparatus for wireless communication.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a multicast/broadcast component 808 or a unicast component 810, among other examples.

In some aspects, the apparatus 800 may be configured to perform one or more operations described herein. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive an indication that a 5GMS service is partially available over 5MBS. The reception component 802 may receive information that indicates a first set of resources of the 5GMS service that are accessible or delivered via 5G unicast, and a second set of resources of the 5GMS service that are accessible or delivered via 5MBS, wherein the second set of resources are hosted on a 5GMS AS of the UE. The reception component 802 or the transmission component 804 may receive or transmit data associated with the 5GMS service. The multicast/broadcast component 808 may include, for example, a 5MBS client, a 5GMS AS, or an MBSTF client. The unicast component 810 may include, for example, a 5GMS client, a media session handler, or a media player.

The reception component 802 may receive data of the first set of resources from a 5GMS on a data network.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving an indication that a 5G media streaming (5GMS) service is partially available over a 5g multicast/broadcast service (5MBS); receiving information that indicates a first set of resources of the 5GMS service that are accessible or delivered via 5G unicast, and a second set of resources of the 5GMS service that are accessible or delivered via 5MBS, wherein the second set of resources are hosted on a 5GMS application server (AS) of the UE; and receiving or transmitting data associated with the 5GMS service.

Aspect 2: The method of Aspect 1, wherein the 5GMS AS is included in a 5MBS client of the UE.

Aspect 3: The method of Aspect 2, wherein the UE includes a 5GMS client, and wherein the method further comprises: accessing the first set of resources via 5G unicast over a data network using the 5GMS client; and accessing the second set of resources via 5MBS using the 5MBS client.

Aspect 4: The method of Aspect 3, wherein accessing the first set of resources and accessing the second set of resources is based at least in part on a policy associated with a use case or a configuration associated with the 5GMS service.

Aspect 5: The method of any of Aspects 1-4, further comprising: receiving data of the first set of resources from a 5GMS on a data network.

Aspect 6: The method of any of Aspects 1-5, wherein the indication is received by a media session handler of a 5GMS client of the UE, and wherein the indication is received in a 5GMS service announcement.

Aspect 7: The method of any of Aspects 1-6, wherein the second set of resources is accessible or delivered only via a 5MBS user service.

Aspect 8: The method of any of Aspects 1-7, wherein receiving or transmitting data associated with the 5GMS service further comprises: receiving or transmitting data via 5G unicast and via 5MBS.

Aspect 9: The method of any of Aspects 1-8, wherein the indication is a streaming manifest.

Aspect 10: The method of Aspect 9, wherein the streaming manifest is a dynamic adaptive streaming over HTTP media presentation description.

Aspect 11: The method of Aspect 9, wherein the streaming manifest is a hypertext transfer protocol live streaming playlist file.

Aspect 12: A method of wireless communication performed by a user equipment (UE), comprising: receiving an indication that a 5G media streaming (5GMS) service is partially available over a multicast/broadcast service (MBS); receiving information that indicates a first set of resources of the 5GMS service that are accessible or delivered via 5G unicast, and a second set of resources of the 5GMS service that are accessible or delivered via the MBS, wherein the second set of resources are hosted on a server of the UE; and receiving or transmitting data associated with the 5GMS service.

Aspect 13: The method of Aspect 12, wherein the server is included in an MBS client of the UE.

Aspect 14: The method of Aspect 2, wherein the UE includes a 5GMS client, and wherein the method further comprises: accessing the first set of resources via 5G unicast over a data network using the 5GMS client; and accessing the second set of resources via MBS using the MBS client.

Aspect 15: The method of Aspect 3, wherein accessing the first set of resources and accessing the second set of resources is based at least in part on a policy associated with a use case or a configuration associated with the 5GMS service.

Aspect 16: The method of any of Aspects 12-15, further comprising: receiving data of the first set of resources from a 5GMS on a data network.

Aspect 17: The method of any of Aspects 12-16, wherein the indication is received by a media session handler of a 5GMS client of the UE, and wherein the indication is received in a 5GMS service announcement.

Aspect 18: The method of any of Aspects 12-17, wherein the second set of resources is accessible or delivered only via an MBS user service.

Aspect 19: The method of any of Aspects 12-18, wherein receiving or transmitting data associated with the 5GMS service further comprises: receiving or transmitting data via 5G unicast and via the MBS.

Aspect 20: The method of any of Aspects 12-19, wherein the indication is a streaming manifest.

Aspect 21: The method of Aspect 20, wherein the streaming manifest is a dynamic adaptive streaming over hypertext transfer protocol (HTTP) media presentation description.

Aspect 22: The method of Aspect 21, wherein the streaming manifest is a hypertext transfer protocol live streaming (HLS) M3U8 playlist file.

Aspect 23: The method of any of Aspects 12-22, wherein the first set of resources is identical to the second set of resources.

Aspect 24: The method of any of Aspects 12-23, wherein a parameter of the first set of resources is different than a parameter of the second set of resources, wherein the parameter includes at least one of: an encoding method, a horizontal visual presentation size, a vertical visual presentation size, a picture aspect radio, a data rate of delivery, a duration of a media presentation, an audio language, a caption, a parental rating, a quality of service, an availability start time, a content protection parameter, a media content component, a charging policy, a targeted advertisement parameter, or a regional replacement content parameter.

Aspect 24: An apparatus for wireless communication at a device, comprising a processor; memory coupled with the processor; and instructions stored in the memory and executable by the processor to cause the apparatus to perform the method of one or more of Aspects 1-23.

Aspect 25: A device for wireless communication, comprising a memory and one or more processors coupled to the memory, the one or more processors configured to perform the method of one or more of Aspects 1-23.

Aspect 26: An apparatus for wireless communication, comprising at least one means for performing the method of one or more of Aspects 1-23.

Aspect 27: A non-transitory computer-readable medium storing code for wireless communication, the code comprising instructions executable by a processor to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving an indication that a 5G media streaming (5GMS) service is partially available over a multicast/broadcast service (MBS);
   receiving information that indicates a first set of resources of the 5GMS service that are accessible or delivered via 5G unicast, and a second set of resources of the 5GMS service that are accessible or delivered via the MBS, the second set of resources being hosted on a 5GMS application server (AS) within a transport function client of the UE, the UE including a 5G multicast/broadcast service (5MBS) client comprising the transport function client and a multicast/broadcast service function (MBSF) client; and
   receiving or transmitting data associated with the 5GMS service.

2. The method of claim 1, wherein the UE includes a 5GMS client, and wherein the method further comprises:
   accessing the first set of resources via 5G unicast over a data network using the 5GMS client; and
   accessing the second set of resources via MBS using the 5MBS client.

3. The method of claim 2, wherein accessing the first set of resources and accessing the second set of resources is based at least in part on a policy associated with a use case or a configuration associated with the 5GMS service.

4. The method of claim 1, further comprising:
   receiving data of the first set of resources from a 5GMS on a data network.

5. The method of claim 1, wherein the indication is received by a media session handler of a 5GMS client of the UE, and wherein the indication is received in a 5GMS service announcement.

6. The method of claim 1, wherein the second set of resources is accessible or delivered only via an MBS user service.

7. The method of claim 1, wherein receiving or transmitting data associated with the 5GMS service further comprises:
   receiving or transmitting data via 5G unicast and via the MBS.

8. The method of claim 1, wherein the indication is a streaming manifest.

9. The method of claim 8, wherein the streaming manifest is a dynamic adaptive streaming over hypertext transfer protocol (HTTP) media presentation description.

10. The method of claim 8, wherein the streaming manifest is a hypertext transfer protocol live streaming (HLS) M3U8 playlist file.

11. The method of claim 1, wherein the first set of resources is identical to the second set of resources.

12. The method of claim 1, wherein a parameter of the first set of resources is different than a parameter of the second set of resources, wherein the parameter includes at least one of:
   an encoding method,
   a horizontal visual presentation size, a vertical visual presentation size,
a picture aspect radio,
a data rate of delivery,
a duration of a media presentation,
an audio language,
a caption,
a parental rating,
a quality of service,
an availability start time,
a content protection parameter,
a media content component,
a charging policy,
a targeted advertisement parameter, or
a regional replacement content parameter.

13. An apparatus for wireless communication at a user equipment (UE), comprising:
one or more memories; and
one or more processors, coupled to the one or more memories, configured to:
receive an indication that a 5G media streaming (5GMS) service is partially available over a multicast/broadcast service (MBS);
receive information that indicates a first set of resources of the 5GMS service that are accessible or delivered via 5G unicast, and a second set of resources of the 5GMS service that are accessible or delivered via the MBS, the second set of resources being hosted on a 5GMS application server (AS) within a transport function client of the UE, the UE including a 5G multicast/broadcast service (5MBS) client comprising the transport function client and a multicast/broadcast service function (MBSF) client; and
receive or transmit data associated with the 5GMS service.

14. The apparatus of claim 13, wherein the UE includes a 5GMS client, and wherein the one or more processors are configured to:
access the first set of resources via 5G unicast over a data network using the 5GMS client; and
access the second set of resources via the MBS using the 5MBS client.

15. The apparatus of claim 14, wherein accessing the first set of resources and accessing the second set of resources is based at least in part on a policy associated with a use case or a configuration associated with the 5GMS service.

16. The apparatus of claim 13, wherein the one or more processors are further configured to:
receive data of the first set of resources from a 5GMS on a data network.

17. The apparatus of claim 13, wherein the indication is received by a media session handler of a 5GMS client of the UE, and wherein the indication is received in a 5GMS service announcement.

18. The apparatus of claim 13, wherein the second set of resources is accessible or delivered only via an MBS user service.

19. The apparatus of claim 13, wherein the one or more processors, to receive or transmit data associated with the 5GMS service, are configured to:
receive or transmit data via 5G unicast and via the MBS.

20. The apparatus of claim 13, wherein the indication is a streaming manifest.

21. The apparatus of claim 20, wherein the streaming manifest is a dynamic adaptive streaming over hypertext transfer protocol (HTTP) media presentation description.

22. The apparatus of claim 21, wherein the streaming manifest is a hypertext transfer protocol live streaming (HLS) M3U8 playlist file.

23. A non-transitory computer-readable medium storing a set of instructions for wireless communication, the set of instructions comprising:
one or more instructions that, when executed by one or more processors of a user equipment (UE), cause the UE to:
receive an indication that a 5G media streaming (5GMS) service is partially available over a multicast/broadcast service (MBS);
receive information that indicates a first set of resources of the 5GMS service that are accessible or delivered via 5G unicast, and a second set of resources of the 5GMS service that are accessible or delivered via the MBS, the second set of resources being hosted on a 5GMS application server (AS) within a transport function client of the UE, the UE including a 5G multicast/broadcast service (5MBS) client comprising the transport function client and a multicast/broadcast service function (MBSF) client; and
receive or transmit data associated with the 5GMS service.

24. The non-transitory computer-readable medium of claim 23, wherein the UE includes a 5GMS client, and wherein the one or more instructions further cause the UE to:
access the first set of resources via 5G unicast over a data network using the 5GMS client; and
access the second set of resources via the MBS using the 5MBS client.

25. The non-transitory computer-readable medium of claim 24, wherein accessing the first set of resources and accessing the second set of resources is based at least in part on a policy associated with a use case or a configuration associated with the 5GMS service.

26. The non-transitory computer-readable medium of claim 24, wherein the one or more instructions further cause the UE to:
start the 5GMS service using a hybrid service identified based at least in part on a policy corresponding to the 5GMS service.

27. The non-transitory computer-readable medium of claim 26, wherein the hybrid service is provided via the 5G unicast and the MBS.

28. An apparatus for wireless communication, comprising:
means for receiving an indication that a 5G media streaming (5GMS) service is partially available over a multicast/broadcast service (MBS);
means for receiving information that indicates a first set of resources of the 5GMS service that are accessible or delivered via 5G unicast, and a second set of resources of the 5GMS service that are accessible or delivered via the MBS, the second set of resources being hosted on a 5GMS application server (AS) within a transport function client of the apparatus, the apparatus including a 5G multicast/broadcast service (5MBS) client comprising the transport function client and a multicast/broadcast service function (MBSF) client; and
means for receiving or transmitting data associated with the 5GMS service.

29. The apparatus of claim 28, wherein the apparatus includes a 5GMS client, and wherein the apparatus further comprises:
means for accessing the second set of resources via MBS using the 5MBS client.

30. The apparatus of claim 28, wherein the indication is a streaming manifest.

\* \* \* \* \*